US010662925B2

United States Patent
Yin et al.

(12) United States Patent
(10) Patent No.: US 10,662,925 B2
(45) Date of Patent: May 26, 2020

(54) METHOD AND APPARATUS FOR YAW CONTROL OF WIND TURBINE UNDER TYPHOON

(71) Applicant: JIANGSU GOLDWIND SCIENCE & TECHNOLOGY CO., LTD., Yancheng, Jiangsu (CN)

(72) Inventors: Jinfeng Yin, Beijing (CN); Huixun Li, Beijing (CN); Gang Deng, Beijing (CN)

(73) Assignee: Jiangsu Goldwind Science & Technology Co., Ltd, Yancheng, Jiangsu (CN)

( * ) Notice: Subject to any disclaimer, the term of this patent is extended or adjusted under 35 U.S.C. 154(b) by 0 days.

(21) Appl. No.: 16/251,604

(22) Filed: Jan. 18, 2019

(65) Prior Publication Data

US 2019/0234377 A1 Aug. 1, 2019

(30) Foreign Application Priority Data

Jan. 29, 2018 (CN) .......................... 2018 1 0084798

(51) Int. Cl.
*F03D 7/02* (2006.01)
*F03D 7/04* (2006.01)
*F03D 17/00* (2016.01)

(52) U.S. Cl.
CPC ......... *F03D 7/0268* (2013.01); *F03D 7/0204* (2013.01); *F03D 7/0244* (2013.01); (Continued)

(58) Field of Classification Search
CPC .... F03D 7/0268; F03D 7/0204; F03D 7/0244; F03D 7/042; F03D 17/00
See application file for complete search history.

(56) References Cited

U.S. PATENT DOCUMENTS

2004/0253093 A1* 12/2004 Shibata ................. F03D 7/0204 415/4.1
2011/0299975 A1* 12/2011 Pechlivanoglou .... F03D 7/0204 415/123

(Continued)

FOREIGN PATENT DOCUMENTS

CN 101189430 A 5/2008
CN 101363404 A 2/2009

(Continued)

OTHER PUBLICATIONS

CN 106677983 A document (Year: 2017).*

(Continued)

*Primary Examiner* — Viet P Nguyen

(57) ABSTRACT

A method and an apparatus for yaw control of a wind turbine under a typhoon. The method for yaw control may include: determining, before or when the typhoon comes, whether there is a fault in a yaw system of the wind turbine; performing a normal yaw control over the wind turbine according to the wind direction, if determination is negative; and performing a yaw control corresponding to the fault on the wind turbine according to the wind direction, if determination is positive. The yaw control corresponding to the fault is performed before or when the typhoon comes, in case of one of a yaw drive mechanism fault, an electronic brake mechanism fault, or a hydraulic brake mechanism fault. The wind turbine is downwind oriented and yaw load reduction is achieved.

11 Claims, 4 Drawing Sheets

Wind direction
$M_{ZF}$
$F_{ZF}$
$M_{YF}$ $F_{YF}$
ZF
$F_{XF}$
$M_{XF}$
YF XF

(52) U.S. Cl.
CPC ............. *F03D 7/042* (2013.01); *F03D 17/00* (2016.05); *F05B 2260/90* (2013.01); *F05B 2270/107* (2013.01); *F05B 2270/321* (2013.01); *F05B 2270/329* (2013.01)

(56) References Cited

U.S. PATENT DOCUMENTS

2012/0133147 A1* 5/2012 Numajiri ............... F03D 7/0268 290/55
2012/0217748 A1* 8/2012 Gjerlov ................. F03D 7/0204 290/44
2012/0242085 A1* 9/2012 Garfinkel ............. F03D 7/0204 290/44
2013/0170989 A1* 7/2013 Trede .................... F03D 7/0204 416/9
2014/0035285 A1 2/2014 Creaby et al.
2014/0072402 A1* 3/2014 Canedo Pardo ........ F03D 80/00 415/9
2014/0133983 A1* 5/2014 Canedo Pardo ...... F03D 7/0244 416/9
2014/0219796 A1* 8/2014 Caruso .................. F03D 7/0244 416/1
2017/0022973 A1* 1/2017 Morimoto ............. F03D 1/0675
2019/0101101 A1* 4/2019 Dharmadhikari ....... F03D 17/00
2019/0136831 A1* 5/2019 Abreu ................... F03D 7/0244

FOREIGN PATENT DOCUMENTS

CN 103321840 A 9/2013
CN 103502637 A 1/2014
CN 106593767 A 4/2017
CN 107587977 A 1/2018

OTHER PUBLICATIONS

CN 106677983 A English translation (Year: 2017).*
The First Chinese Office Action dated Nov. 26, 2019; Appln. No. 201810084798.0.

* cited by examiner

METHOD AND APPARATUS FOR YAW CONTROL OF WIND TURBINE UNDER TYPHOON

The present disclosure claims the priority to Chinese Patent Application No. 201810084798.0, titled "METHOD AND APPARATUS FOR YAW CONTROL OF WIND TURBINE UNDER TYPHOON", filed on Jan. 29, 2018, with the State Intellectual Property Office of People's Republic of China, the content of which is incorporated herein by reference.

FIELD

The present disclosure relates to the technical field of wind power generation, and in particular, to a method and an apparatus for yaw control of a wind turbine under a typhoon.

BACKGROUND

When a typhoon arrives, a load on a wind turbine is increased. In a case that the yaw load is not reduced timely, the wind turbine even the entire wind farm is apt to be damaged.

A yaw system of a wind turbine may generally include a hydraulic brake mechanism, an electronic brake mechanism, and a yaw drive mechanism.

In a case that there is a certain wind direction deviation angle between a wind direction and an axis of a nacelle of the wind turbine, which lasts for a period of time, the axis of the nacelle is adjusted to a direction consistent with the wind direction by the yaw drive mechanism, thereby the nacelle is downwind oriented. In yaw, the electronic brake mechanism is released first, and the hydraulic brake mechanism is in a semi-released state, so as to set a sufficient damping and maintain sufficient stability of the nacelle during yaw. The yaw drive mechanism may include a yaw motor. The yaw motor drives a pinion and in turn drives the entire nacelle to rotate along a yaw bearing, achieving yaw of the nacelle.

In a case that the yaw motor is stopped, the hydraulic brake mechanism is in a braking state, and fixes the nacelle to a corresponding position. In a case that the nacelle yaws to a certain angle, a generator cable that extends from the nacelle to the bottom of the tower is in a winding state. In such case, the wind turbine performs a cable-unwinding process. Namely, the wind turbine yaws oppositely to a direction of the cable winding, so as to unwind the cable. The hydraulic brake mechanism is in a fully released state in order to unwind the cable quickly.

As described above, cooperation of the hydraulic brake mechanism, the electronic brake mechanism, and the yaw drive mechanism is required to implement the yaw control of the wind turbine. In a case that the yaw system fails, it is difficult to perform an effective yaw control on the wind turbine.

SUMMARY

Various aspects of the present disclosure can at least address the above mentioned issues and/or disadvantages, and at least provide the following advantages.

According to an aspect of the present disclosure, a method for yaw control of a wind turbine under a typhoon is provided. The method for yaw control may include: determining, before or when the typhoon comes, whether there is a fault in a yaw system of the wind turbine; performing a normal yaw control on the wind turbine according to a wind direction, if determination is positive; and performing a yaw control corresponding to the fault, on the wind turbine according to the wind direction, if determination is negative.

Optionally, the yaw system includes a yaw drive mechanism, an electronic brake mechanism, and a hydraulic brake mechanism, where the electronic brake mechanism includes multiple electronic brake units, and the fault in the yaw system includes one of following: a yaw drive mechanism fault, an electronic brake mechanism fault or a hydraulic brake mechanism fault.

Optionally, performing the normal yaw control on the wind turbine according to the wind direction includes: determining whether a wind direction deviation angle between an axis of a nacelle of the wind turbine and the wind direction is within a safety range; in response to the wind direction deviation angle being within the safety range, controlling the electronic brake mechanism to perform braking, and controlling the hydraulic brake mechanism to perform full pressure braking; and in response to the wind direction deviation angle not being within the safety range for a first predetermined time, controlling the hydraulic brake mechanism to perform residual pressure braking, and controlling the yaw drive mechanism to drive the nacelle to rotate, so that the wind direction deviation angle falls within the safety range.

Optionally, the fault in the yaw system is the yaw drive mechanism failure, and performing the yaw control corresponding to the fault on the wind turbine according to the wind direction, if the determination is positive, includes: determining whether a wind direction deviation angle between an axis of a nacelle of the wind turbine and the wind direction is within a safety range; in response to the wind direction deviation angle being within the safety range, controlling the electronic brake mechanism to perform braking, and controlling the hydraulic brake mechanism to perform full pressure braking; and in response to the wind direction deviation angle not being within the safety range for a second predetermined time, controlling the hydraulic brake mechanism to perform residual pressure braking, and controlling the electronic brake mechanism to perform braking according to a yaw velocity or a yaw acceleration of the wind turbine, so that the wind direction deviation angle falls within the safety range.

Optionally, controlling the electronic brake mechanism to perform braking according to the yaw velocity or the yaw acceleration of the wind turbine includes: determining whether the yaw velocity or the yaw acceleration is larger than a first predetermined threshold; controlling, in response to the yaw velocity or the yaw acceleration being larger than the first predetermined threshold, the electronic brake mechanism to perform braking; determining whether the yaw velocity or the yaw acceleration is smaller than a second predetermined threshold; releasing, in response to the yaw velocity or the yaw acceleration being smaller than the second predetermined threshold, the electronic brake mechanism.

Optionally, controlling the electronic brake mechanism to perform braking includes: activating each of the multiple electronic brake units sequentially, where each time in response to any one of the multiple electronic brake units being activated, determining whether the yaw velocity or the yaw acceleration is larger than the first predetermined threshold, and activating, in response to the yaw velocity or yaw acceleration being larger than the first predetermined threshold, a next one of the multiple electronic brake units, until the yaw velocity or the yaw acceleration is smaller than or equal to the first predetermined threshold; and where activating the any one of the multiple electronic brake units includes: performing, during a first predetermined number of braking periods, inching braking by the any one of the multiple electronic brake units, where a braking time in each of the first predetermined quantity of braking period is: (a quantity of braking periods from activating the any one of the multiple electronic brake units to a current braking period+1)×an inching braking time; and braking continuously, by the any one of the multiple electronic brake units, after the first predetermined quantity of brake periods elapse.

Optionally, releasing the electronic brake mechanism includes: releasing each of the multiple electronic brake units in sequence, where each time in response to any one of the multiple electronic brake units being released, determining whether the yaw velocity or the yaw acceleration is smaller than the second predetermined threshold, and releasing, in response to the yaw velocity or the yaw acceleration being larger than or equal to the second predetermined threshold, a next one of the multiple electronic brake units, until the yaw velocity or the yaw acceleration is smaller than the first predetermined threshold; and releasing the any one of the multiple electronic brake units includes: releasing, during a second predetermined quantity of releasing periods, the any one of the multiple electronic brake units, where a releasing time in each of the second predetermined quantity of releasing periods is: (a quantity of releasing periods after releasing the any one of the multiple electronic brake units+1)×a unit releasing time; and releasing the any one of electronic brake units fully, after the second predetermined quantity of releasing periods.

Optionally, the fault in the yaw system is the hydraulic brake mechanism fault, and performing the yaw control corresponding to the fault on the wind turbine according to the wind direction includes: determining whether a wind direction deviation angle between an axis of a nacelle of the wind turbine and the wind direction is within a safety range; in response to the wind direction deviation angle being within the safety range, controlling the electronic brake mechanism to perform braking; and in response to the wind direction deviation angle not being within the safety range for a third predetermined time, controlling the hydraulic brake mechanism to perform braking in a manner corresponding to the hydraulic brake mechanism fault, and controlling the yaw drive mechanism to drive the nacelle to rotate, to reduce the wind direction deviation angle.

Optionally, controlling the hydraulic brake mechanism to perform braking in the manner corresponding to the hydraulic brake mechanism fault includes: controlling, in response to the hydraulic brake mechanism failing to switch from a full pressure state to a residual pressure state, the hydraulic brake mechanism to be in a zero pressure state; and controlling, in response to the hydraulic brake mechanism failing to switch between the residual pressure state and the zero pressure state, the hydraulic brake mechanism to maintain the residual pressure state or the zero pressure state.

Optionally, the fault of the yaw system is a fault of at least one of the multiple electronic brake units, and performing the yaw control corresponding to the fault on the wind turbine according to the wind direction includes: determining whether a wind direction deviation angle between an axis of a nacelle of the wind turbine and the wind direction is within a safety range; in response to the wind direction deviation angle being within the safety range, controlling the multiple electronic brake units other than the at least one of the multiple electronic brake units to perform braking, and controlling the hydraulic brake mechanism to perform full pressure braking; and in response to the wind direction deviation angle not being within the safety range for a fourth predetermined time, controlling the hydraulic brake mechanism to perform residual pressure braking, and controlling the yaw drive mechanism to drive the nacelle to rotate, so that the wind direction deviation angle falls within the safety range.

According to another aspect of the present disclosure, a computer readable storage medium is provided. The computer readable storage medium stores instructions, where the instructions when executed by a processor make the processor execute the aforementioned method for yaw control.

According to another aspect of the present disclosure, an apparatus for yaw control of a wind turbine is provided. The apparatus for yaw control includes a processor and a memory, where the memory stores instructions, and the instructions when executed by a processor make the processor execute the aforementioned method for yaw control.

The present disclosure provides a method and an apparatus for yaw control. Before or when the typhoon comes, a yaw control corresponding to the fault is performed in a case that there is one of the yaw drive mechanism fault, the electronic brake mechanism fault, or the hydraulic brake mechanism fault. Thereby, the wind turbine is oriented downwind and yaw load reduction is achieved. The yaw velocity or the yaw acceleration is effectively controlled.

Additional aspects and/or advantages of the overall concept of the present disclosure are partially demonstrated in the following description. Other parts are clear from the description or can be deduced from embodiments of the present disclosure.

BRIEF DESCRIPTION OF THE DRAWINGS

Reference is made is detail to embodiments of the present disclosure. Examples of the embodiments are illustrated in the drawings, where same reference numerals represent same components. Hereinafter, embodiments of the present disclosure are described in conjunction with the drawings to explain the present disclosure.

DETAILED DESCRIPTION OF THE EMBODIMENTS

Hereinafter, exemplary embodiments of the concept of the present disclosure are described in detail with reference to the drawings.

A wind turbine needs to enter a specific control mode under certain circumstances (such as before a typhoon comes or when a typhoon comes). In such control mode, the wind turbine is generally at a stopped state, the blades are feathered and locked, and the wind wheel is at a free-rotation state. A yaw priority control is required for the wind turbine, so as to control the wind turbine in real-time and the wind turbine is downwind oriented, thereby reducing a load on the wind turbine.

Figure 1:
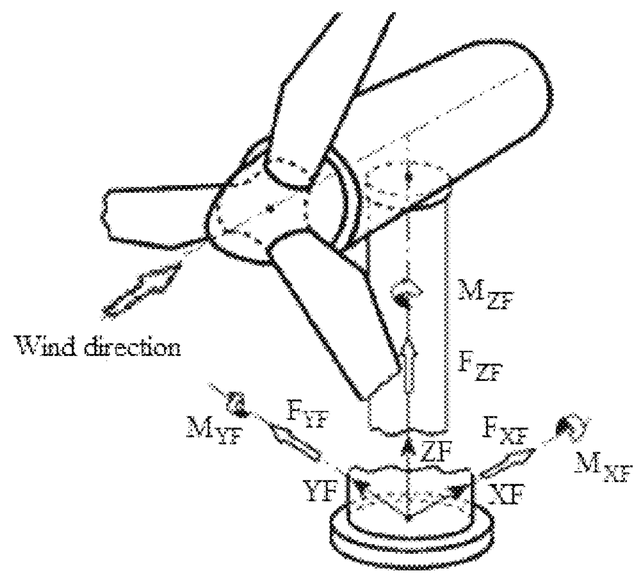
FIG. 1 is a schematic view of a wind turbine being upwind oriented according to an exemplary embodiment of the present disclosure.
Figure 2:
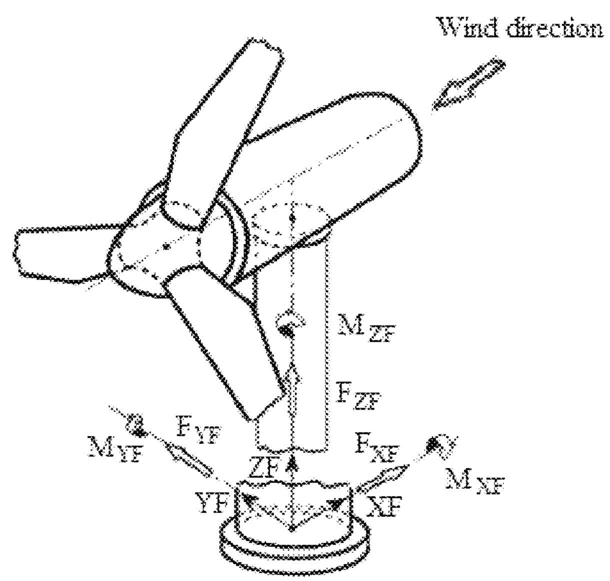
FIG. 2 is a schematic view of a wind turbine being downwind oriented according to an exemplary embodiment of the present disclosure.

FIG. 1 is a schematic view of a wind turbine being upwind oriented according to an exemplary embodiment of the present disclosure. FIG. 2 is a schematic view of a wind turbine being downwind oriented according to an exemplary embodiment of the present disclosure. As shown in FIGS. 1 and 2, in case of the wind turbine being downwind oriented, a head of the nacelle of the wind turbine is oriented downwind. In case of the wind turbine being upwind oriented, the head of the nacelle of the wind turbine is oriented upwind. In such case, it is required to control the wind turbine to yaw, so as to move the wind turbine toward a state of being downwind oriented.

Figure 3:
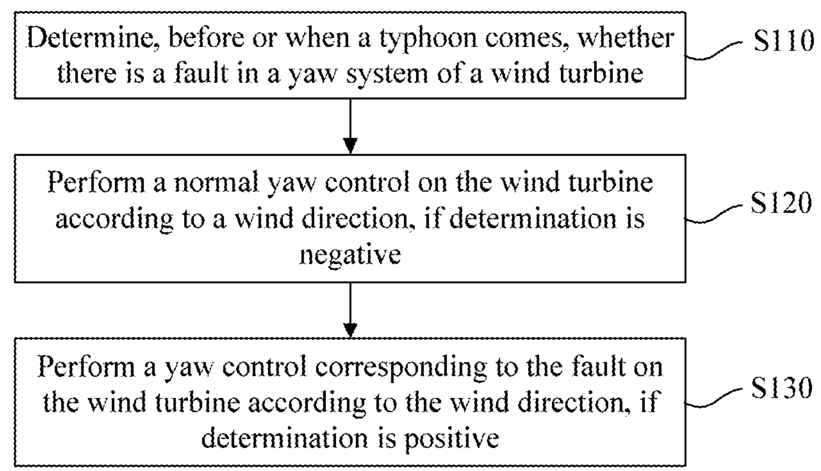
FIG. 3 is a flow chart of a method for yaw control according to an exemplary embodiment of the present disclosure.

FIG. 3 is a flow chart of a method for yaw control according to an exemplary embodiment of the present disclosure. As shown in FIG. 3, in step S110, it is determined, before or when the typhoon comes, whether there is a fault in a yaw system of the wind turbine. In step S120, a normal yaw control is performed on the wind turbine according to a wind direction if determination is negative. In such case, a wind direction deviation angle between an axis of a nacelle and the wind direction is determined according to the wind direction. In a case that the wind direction deviation angle exceeds the safety range for a period of time, a drive mechanism is controlled to drive the nacelle to rotate, so that the wind direction deviation angle falls within the safety range. Yaw is achieved, and the head of the nacelle is oriented downwind. In another aspect, in step S130, a yaw control corresponding to the fault is performed on the wind turbine according to the wind direction, if determination is positive.

As an example, the yaw system includes a yaw drive mechanism, an electronic brake mechanism, and a hydraulic brake mechanism. The electronic brake mechanism includes multiple electronic brake units. The fault in the yaw system include one of the following faults: a yaw drive mechanism fault, an electronic brake mechanism fault or a hydraulic brake mechanism fault.

Figure 4:
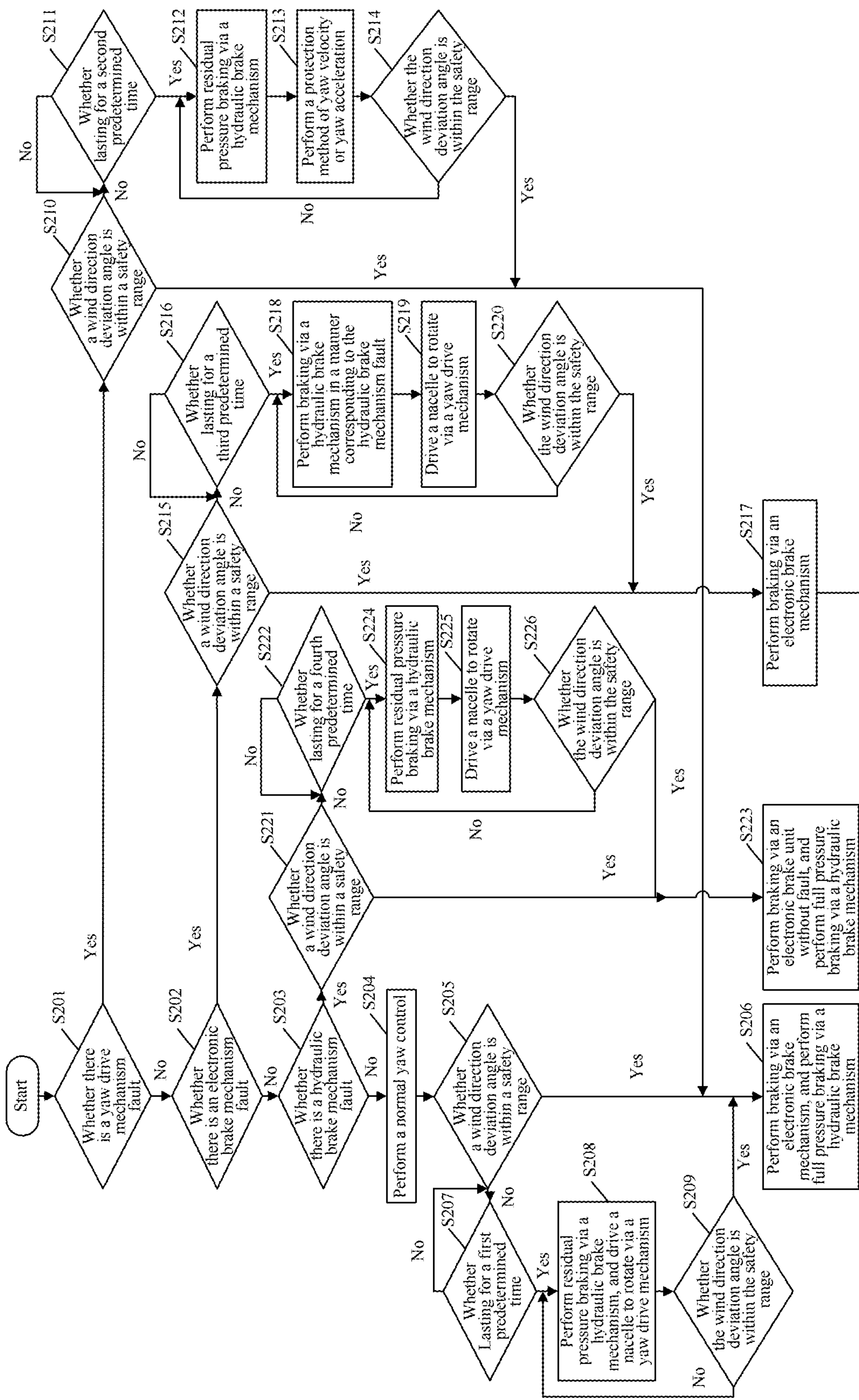
FIG. 4 is a flow chart of a method for yaw control according to another exemplary embodiment of the present disclosure.

FIG. 4 is a flow chart of a method for yaw control according to another exemplary embodiment of the present disclosure. As shown in FIG. 4, in steps S201 to S203, it is determined whether there is the yaw drive mechanism fault, the electronic brake mechanism fault, or the hydraulic brake mechanism fault. The yaw control corresponding to the fault is performed in case of the yaw drive mechanism fault, the electronic brake mechanism fault, or the hydraulic brake mechanism fault. In step S204, a normal yaw control is performed in a case that there is none of the yaw drive mechanism fault, the electronic brake mechanism fault and the hydraulic brake mechanism.

In a case that the normal yaw control is performed, in step S205, it is determined whether the wind direction deviation angle between the axis of the nacelle of the wind turbine and the wind direction is within the safety range. In step S206, the electronic brake mechanism is controlled to perform braking, and the hydraulic brake mechanism is controlled to perform full pressure braking, in response to the wind direction deviation angle being within the safety range. In step S207, it is determined whether such case lasts for a first predetermined time, in response to the wind direction deviation angle not being within the safety range. In response to such case lasting for the first predetermined time, in step S208, the hydraulic brake mechanism is controlled to perform residual pressure braking, so as to provide sufficient damping and control the yaw drive mechanism to drive the nacelle to rotate, so that the wind direction deviation angle falls within the safety range. Afterwards, in step S209, it is determined again whether the wind direction deviation angle is within the safety range. In response to the wind direction deviation angle being within the safety range, the method goes to the step S206. In response to the wind direction deviation angle not being within the safety range, the method goes to the step S208.

In a case that the fault in the yaw system is the yaw drive mechanism fault, in step S210, it is determined whether the wind direction deviation angle between the axis of the nacelle of the wind turbine and the wind direction is within the safety range. In step S206, the electronic brake mechanism is controlled to perform braking, and the hydraulic brake mechanism is controlled to perform full pressure braking, in response to the wind direction deviation angle being within the safety range, so that the nacelle is stabled at a current position. In step S211, it is determined whether such case lasts for a second predetermined time, in response to the wind direction deviation angle not being within the safety range.

In response to such situation lasting for the second predetermined time, in step S212, the hydraulic brake mechanism is controlled to perform residual pressure braking. In step S213, the electronic brake mechanism is controlled to perform braking according to a yaw velocity or a yaw acceleration of the wind turbine (hereinafter referred to as a protection method of yaw velocity or yaw acceleration), so that the wind direction deviation angle falls within the safety range.

In step S214, it is determined again whether the wind direction deviation angle is within the safety range. In response to the wind direction deviation angle being within the safety range, the method goes to the step S206. Otherwise, the method goes to the step S212.

In a case that the fault in the yaw system is the hydraulic brake mechanism fault, in step S215, it is determined whether the wind direction deviation angle is within the safety range. In step S217, the electronic brake mechanism is controlled to perform braking, in response to the wind direction deviation angle being within the safety range. In step S216, it is determined whether such case lasts for a third predetermined time, in response to the wind direction deviation angle not being within the safety range. In response to such case lasting for the third predetermined time, in step S218, the hydraulic brake mechanism is controlled to perform braking in a manner corresponding to the hydraulic brake mechanism fault. In step S219, the drive mechanism is controlled to drive the nacelle to rotate, so that the wind direction deviation angle is reduced. In step S220, it is determined again whether the wind direction deviation angle is within the safety range. In response to the wind direction deviation angle is within the safety range, the method goes to the step S217. In response to the wind direction deviation angle not being within the safety range, the method goes to the step S218.

As an example, the step S218 may include following steps. In response to the hydraulic brake mechanism failing to switch from a full pressure state to a residual pressure state, the hydraulic brake mechanism is controlled to be in a zero pressure state. In response to the hydraulic brake mechanism failing to switch between the residual pressure state and the zero pressure state, the hydraulic brake mechanism is controlled to maintain the residual pressure state or the zero pressure state.

As an example, in a case that the fault in the yaw system is a fault of at least one of the multiple electronic brake units, in step S221, it is determined whether the wind direction deviation angle between the axis of the nacelle of the wind turbine and the wind direction is within the safety range.

In response to the wind direction deviation angle being within the safety range, in step S223, the multiple electronic brake units other than the at least one of the multiple electronic brake units are controlled to perform braking, and the hydraulic brake mechanism is controlled to perform full pressure braking. In response to the wind direction deviation angle not being within the safety range, in step S222, it is determined whether such case lasts for a fourth predetermined time. In response to such case lasting for the fourth predetermined time, in step S224, the hydraulic brake mechanism is controlled to perform residual pressure braking. In step S225, the yaw drive mechanism is controlled to drive the nacelle to rotate, so that the wind direction deviation angle falls within the safety range. Afterwards, in step S226, it is determined again whether the wind direction deviation angle is within the safety range. In response to the wind direction deviation angle being within the safety range, the method goes to step S223. In response to the wind direction deviation angle not being within the safety range, the method goes to step S224.

In the method shown in FIG. 4, when the nacelle is driven by a tail rudder of the turbine and moves toward being oriented downwind, the braking state is maintained in a case that the yaw velocity or the yaw acceleration is within a predetermined range. Otherwise, additional velocity or acceleration control is required to keep the nacelle stable.

Figure 5:
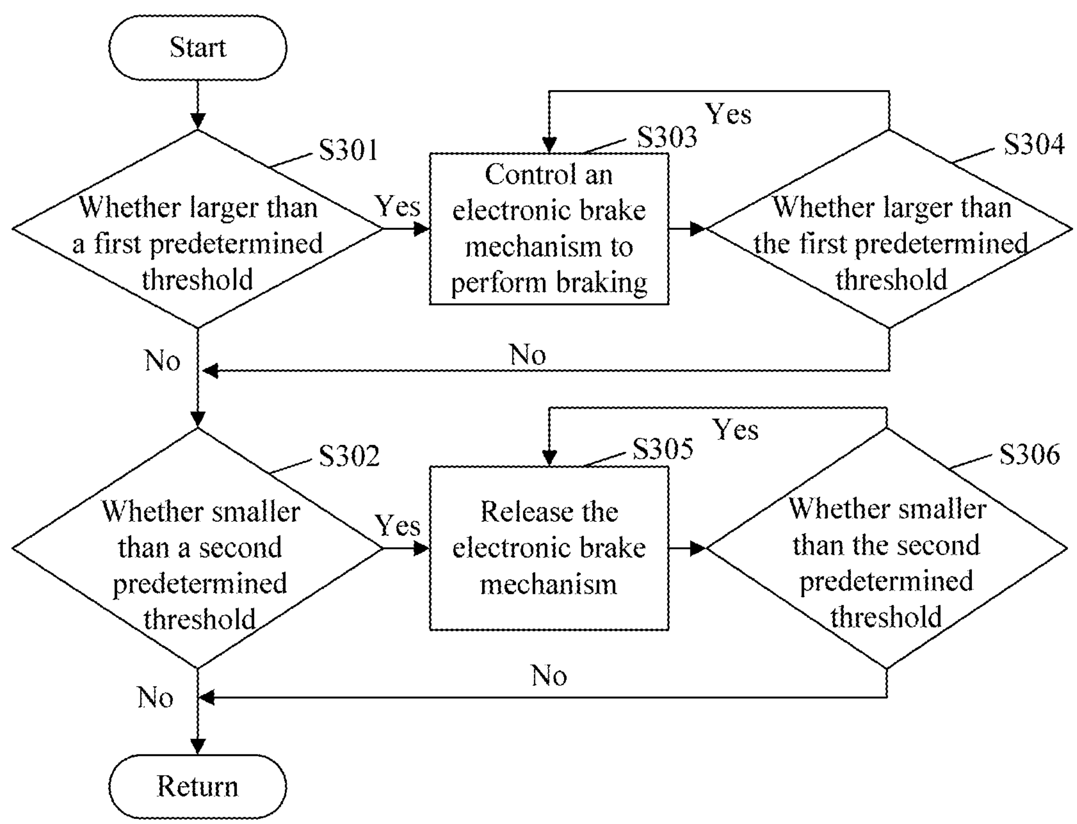
FIG. 5 is a flow chart of a protection method of yaw velocity or yaw acceleration according to an exemplary embodiment of the present disclosure.

FIG. 5 is a flow chart of a protection method of yaw velocity or yaw acceleration according to an exemplary embodiment of the present disclosure. As shown in FIG. 5, the protection method of yaw velocity or yaw acceleration protection includes steps S301 to S306. In step S301, it is determined whether the yaw velocity or the yaw acceleration being larger than a first predetermined threshold. In response to the yaw velocity or the yaw acceleration being larger than the first predetermined threshold, in step S303, the electronic brake mechanism is controlled to perform braking, so that the yaw velocity or the yaw acceleration of the nacelle is reduced. Afterwards, in step S304, it is determined again whether the yaw velocity or the yaw acceleration is larger than the first predetermined threshold. In response to the yaw velocity or the yaw acceleration being larger than the first predetermined threshold, the method goes to the step S303. Otherwise, the method goes to step S302.

In the step S302, it is determined whether the yaw velocity or the yaw acceleration is smaller than a second predetermined threshold. In response to the yaw velocity or the yaw acceleration being smaller than the second predetermined threshold, in step S305, the electronic brake mechanism is released. Afterwards, in step S306, it is determined again whether the yaw velocity or the yaw acceleration is smaller than the second predetermined threshold. In response to the yaw velocity or the yaw acceleration being smaller than the second predetermined threshold, the method goes to the step S305. Otherwise, the method ends.

In the method shown in FIG. 5, when the electronic brake mechanism is controlled to perform braking, each electronic brake unit of the electronic brake mechanism is activated in sequence. In such case, in response to each time an electronic brake unit being activated, it is determined whether the yaw velocity or the yaw acceleration is larger than the first predetermined threshold. In response to the yaw velocity or the yaw acceleration being larger than the first predetermined threshold, a next electronic brake unit is activated, until the yaw velocity or the yaw acceleration is smaller than or equal to the first predetermined threshold.

As an example, that any electronic brake unit is activated includes following steps. During a first predetermined quantity of braking periods, inching braking is performed by the electronic brake unit, where a braking time in each braking period is: (a quantity of braking periods from activating the any one of the multiple electronic brake units to a current braking period+1)×an inching braking time. The electronic brake unit continuously brakes after the first predetermined quantity of brake periods. The inching braking time herein is a unit of the braking time, and may be the braking time of an electronic brake unit during the first braking period. A purpose of defining the braking time in such way is that a time interval for breaking in each braking period gradually increases with increasing of the quantity of braking periods that elapse.

In another aspect, in the method shown in FIG. 3, when the electronic brake mechanism is released, each electronic brake unit of the electronic brake mechanism is released in sequence. In response to each time an electronic brake unit being released, it is determined whether the yaw velocity or the yaw acceleration is smaller than the second predetermined threshold. In response to the yaw velocity or the yaw acceleration being larger than or equal to the second predetermined threshold, a next electronic brake unit is released, until the yaw velocity or the yaw acceleration is smaller than the second predetermined threshold.

As an example, that any electronic brake unit is released includes following steps. During a second predetermined quantity of releasing periods, the electronic brake unit is released, where a releasing time in each releasing period is: (a quantity of releasing periods after releasing the electronic brake unit+1)×a unit releasing time. The electronic brake unit is fully released after the second predetermined quantity of releasing periods. Here, the "(a quantity of releasing periods after releasing the electronic brake unit+1)×a unit releasing time" is taken as a time interval for releasing the electronic brake unit in each releasing period. A purpose thereof is that the time interval for releasing the electronic brake unit in each releasing period gradually increases as the releasing periods elapse.

In the aforementioned steps of activating any electronic brake unit and releasing any electronic brake unit, a stepwise switching-on or switching-off (namely, activating or releasing) of the electronic brake unit is achieved to avoid vibration of the nacelle.

As an example, the aforementioned safety range of the wind direction deviation angle may be 10 degrees, and the aforementioned predetermined time may be 10 seconds. The quantity of the electronic brake units may be eight. The hydraulic brake mechanism may perform fully pressure braking with 175 bar and perform residual pressure braking with 20 bar. The first predetermined threshold may be 0.5 degrees per second or 0.2 degrees per quadratic second. The braking period or the releasing period may be 1 second. The inching braking time or the unit releasing time may be 0.2 second. The second predetermined threshold may be 0.1 degrees per second. The above numerical values are only intended for examples, and the present disclosure is not limited thereto.

According to another exemplary embodiment of the present disclosure, a computer readable storage medium is provided. The computer readable storage medium stores instructions, and the instructions when executed by a processor make the processor execute the aforementioned method for yaw control.

According to another exemplary embodiment of the present disclosure, an apparatus for yaw control of a wind turbine is provided. The yaw control apparatus includes a processor and a memory. The memory stores instructions. The instructions when executed by a processor make the processor execute the aforementioned method for yaw control.

The computer readable storage medium includes program instructions, data files, data structure, etc., or a combination thereof. A program recorded in the computer readable storage medium may be programmed or configured to implement the method of the present disclosure. The computer readable storage medium further includes a hardware system for storing and executing the program instructions. The hardware system may be a magnetic medium (such as a hard disk, a floppy disk, and a magnetic tape), or an optical medium (such as a CD-ROM and a DVD), or a magneto-optical medium (such as a floppy optical disk, a ROM, a RAM, and a flash memory, etc.). The program includes assembly language codes or machine codes compiled by a compiler and higher-level language codes interpreted by an interpreter. The hardware system may be implemented with at least one software module to comply with the present disclosure.

One or more general purpose or dedicated computers (for example, processors, controllers, digital signal processors, microcomputers, field programmable arrays, programmable logic units, microprocessors, or any other devices capable of running software or executing instructions) may be utilized to implement at least a portion of the above method. The at least one portion may be implemented in an operating system or in one or more software applications operating under the operating system.

The description of the present disclosure is presented for purposes of illustration and description, and is not intended to exhaust or to limit the present disclosure in the disclosed form. For those skilled in the art, various modifications and changes may be made to the embodiments without departing from the concept of the present disclosure.

The invention claimed is:

1. A method for yaw control of a wind turbine under a typhoon, comprising:

determining, before or when the typhoon comes, whether there is a fault in a yaw system of the wind turbine;

performing a normal yaw control on the wind turbine according to a wind direction, in a case that determination is negative; and performing a yaw control corresponding to the fault on the wind turbine according to the wind direction, in a case that determination is positive, wherein, the yaw system comprises a yaw drive mechanism, an electronic brake mechanism, and a hydraulic brake mechanism, wherein the electronic brake mechanism comprises a plurality of electronic brake units, wherein performing the normal yaw control on the wind turbine according to the wind direction comprises:

determining whether a wind direction deviation angle between an axis of a nacelle, of the wind turbine and the wind direction is within a safety range;

controlling the electronic brake mechanism to perform braking and controlling the hydraulic brake mechanism to perform full pressure braking, in response to the wind direction deviation angle being within the safety range; and controlling the hydraulic brake mechanism to perform residual pressure braking and controlling the yaw drive mechanism to drive the nacelle to rotate, in response to the wind direction deviation angle not being within the safe range for a first predetermined time, so that the wind direction deviation angle falls within the safety range.

2. The method for yaw control according to claim 1, wherein:

the fault in the yaw system comprises one of following: a yaw drive mechanism fault, an electronic brake mechanism faultora hydraulic brake mechanism fault.

3. The method for yaw control according to claim 1, wherein performing the yaw control corresponding to the fault on the wind turbine according to the wind direction, if the determination is positive, comprises:

determining whether a wind direction deviation angle between an axis of a nacelle of the wind turbine and the wind direction is within a safety range;

controlling the electronic brake mechanism to perform braking and controlling the hydraulic brake mechanism to perform full pressure braking, in response to the wind direction deviation angle being within the safety range; and controlling the hydraulic brake mechanism to perform residual pressure braking and controlling the electronic brake mechanism to perform braking according to a yaw velocity or a yaw acceleration of the wind turbine, in response to the wind direction deviation angle not being within the safety range for a second predetermined time, so that the wind direction deviation angle falls within the safety range.

4. The method for yaw control according to claim 3, wherein controlling the electronic brake mechanism to perform braking according to the yaw velocity or the yaw acceleration of the wind turbine comprises:

determining whether the yaw velocity or the yaw acceleration is larger than a first predetermined threshold;

controlling, in response to the yaw velocity or the yaw acceleration being larger than the first predetermined threshold, the electronic brake mechanism to perform braking;

determining whether the yaw velocity or the yaw acceleration is smaller than a second predetermined threshold; and releasing, in response to the yaw velocity or the yaw acceleration being smaller than the second predetermined threshold, the electronic brake mechanism.

5. The method for yaw control according to claim 4, wherein controlling the electronic brake mechanism to perform braking comprises:

activating each of the plurality of electronic brake units sequentially, wherein each time in response to any one of the plurality of electronic brake units being activated:

determining that the yaw velocity or the yaw acceleration is larger than the first predetermined threshold, and activating a next one of the plurality of electronic brake units, until the yaw velocity or the yaw acceleration is smaller than or equal to the first predetermined threshold;

wherein activating the any one of the plurality of electronic brake units comprises:

performing, during a first predetermined quantity of braking periods, inching braking by the any one of the plurality of electronic brake units, wherein a braking time in each of the first predetermined quantity of braking periods is equal to multiplying a result, of one plus a quantity of braking periods from activating the any one of the multiple electronic brake units to a current braking period, by an inching braking time; and braking continuously, by the any one of the plurality of electronic brake units, after the first predetermined quantity of brake periods.

6. The method for yaw control according to claim 4, wherein releasing the electronic brake mechanism comprises:

releasing each of the plurality of electronic brake units sequentially, wherein each time in response to any one of the plurality of electronic brake units being released:

determining that the yaw velocity or the yaw acceleration is smaller than the second predetermined threshold, and releasing a next one of the plurality of electronic brake units, until the yaw velocity or yaw acceleration is smaller than the first predetermined threshold;

wherein releasing the any one of the plurality of electronic brake units comprises:

releasing, during a second predetermined quantity of releasing periods, any one of the plurality of electronic brake units, wherein a releasing time in each of the second predetermined quantity of releasing periods is equal to multiplying a result, of one plus a quantity of releasing periods after releasing the any one of the plurality of electronic brake units, by a unit releasing time; and releasing the any one of the plurality of electronic brake units fully, after the second predetermined quantity of releasing periods.

7. The method for yaw control according to claim 1, wherein the fault in the yaw system is the hydraulic brake mechanism fault, and performing the yaw control corresponding to the fault on the wind turbine according to the wind direction comprises:

determining whether a wind direction deviation angle between an axis of a nacelle of the wind turbine and the wind direction is within a safety range;

controlling the electronic brake mechanism to perform braking, in response to the wind direction deviation angle being within the safety range; and controlling the hydraulic brake mechanism to perform braking in a manner corresponding to the hydraulic brake mechanism fault and controlling the yaw drive mechanism to drive the nacelle to rotate, in response to the wind direction deviation angle not being within the safety range for a third predetermined time, to reduce the wind direction deviation angle.

8. The method for yaw control according to claim 7, wherein controlling the hydraulic brake mechanism to perform braking in the manner corresponding to the hydraulic brake mechanism fault comprises:

controlling, in response to the hydraulic brake mechanism failing to switch from a full pressure state to a residual pressure state, the hydraulic brake mechanism to be in a zero pressure state; and controlling, in response to the hydraulic brake mechanism failing to switch between the residual pressure state and the zero pressure state, the hydraulic brake mechanism to maintain the residual pressure state or the zero pressure state.

9. The method for yaw control according to claim 1, wherein:

the fault in the yaw system is a fault of at least one of the plurality of electronic brake units, and performing the yaw control corresponding to the fault, on the wind turbine according to the wind direction comprises:

determining whether a wind direction deviation angle between an axis of a nacelle of the wind turbine and the wind direction is within a safety range;

controlling the plurality of electronic brake units other than the at least one of the plurality of electronic brake units to perform braking and controlling the hydraulic brake mechanism to perform full pressure braking, in response to the wind direction deviation angle being within the safety range; and controlling the hydraulic brake mechanism to perform residual pressure braking and controlling the yaw drive mechanism to drive the nacelle to rotate, in response to the wind direction deviation angle not being within the safety range for a fourth predetermined time, so that the wind direction deviation angle falls within the safety range.

10. A computer readable storage medium, storing instructions, wherein the instructions when executed by a processor make the processor execute the method for yaw control according to claim 1.

11. An apparatus for yaw control of a wind turbine, comprising:

a processor; and a memory storing instructions, wherein the instructions when executed by a processor make the processor execute the method for yaw control according to claim 1.

* * * * *